(12) United States Patent
Danziger et al.

(10) Patent No.: US 11,448,816 B2
(45) Date of Patent: Sep. 20, 2022

(54) OPTICAL SYSTEMS INCLUDING LIGHT-GUIDE OPTICAL ELEMENTS WITH TWO-DIMENSIONAL EXPANSION

(71) Applicant: Lumus Ltd., Ness Ziona (IL)

(72) Inventors: Yochay Danziger, Kfar Vradim (IL); Ronen Chriki, Lod (IL); Jonathan Gelberg, Modiin (IL)

(73) Assignee: LUMUS LTD., Ness Ziona (IL)

(*) Notice: Subject to any disclaimer, the term of this patent is extended or adjusted under 35 U.S.C. 154(b) by 0 days.

(21) Appl. No.: 17/234,885

(22) Filed: Apr. 20, 2021

(65) Prior Publication Data

US 2021/0239898 A1   Aug. 5, 2021

Related U.S. Application Data

(63) Continuation of application No. 16/638,495, filed as application No. PCT/IL2020/050098 on Jan. 26, 2020, now Pat. No. 10,983,264.
(Continued)

(51) Int. Cl.
*F21V 8/00* (2006.01)
*G02B 27/01* (2006.01)
*G02B 27/14* (2006.01)

(52) U.S. Cl.
CPC ......... *G02B 6/0055* (2013.01); *G02B 6/0028* (2013.01); *G02B 6/0051* (2013.01);
(Continued)

(58) Field of Classification Search
CPC .. G02B 6/0055; G02B 27/145; G02B 6/0051; G02B 6/0028; G02B 27/0172; G02B 2027/0178
See application file for complete search history.

(56) References Cited

U.S. PATENT DOCUMENTS

| 2,748,659 A | 6/1956 | Geffcken et al. |
| 2,795,069 A | 6/1957 | Hardesty |

(Continued)

FOREIGN PATENT DOCUMENTS

| CN | 101542346 | 9/2009 |
| CN | 107238928 | 10/2017 |

(Continued)

OTHER PUBLICATIONS

Da-Yong et al., "A Continuous Membrance Micro Deformable Mirror Based on Anodic Bonding of SOI to Glass Water", Microsystem Technologies, Micro and Nanosystems Information Storage and Processing Systems, vol. 16, No. 10, May 20, 2010 pp. 1765-1769.

*Primary Examiner* — Tracie Y Green
(74) *Attorney, Agent, or Firm* — Mark M. Friedman

(57) ABSTRACT

An optical system including a light-guide optical element (LOE) with first and second sets (204, 206) of mutually-parallel, partially-reflecting surfaces at different orientations. Both sets of partially-reflecting surfaces are located between parallel major external surfaces. A third set of at least partially-reflecting surfaces (202), deployed at the coupling-in region, receive image illumination injected from a projector (2) with an optical aperture having a first in-plane width and direct the image illumination via reflection of at least part of the image illumination at the third set of at least partially-reflective facets towards the first set of partially-reflective facets with an effective optical aperture having a second width larger than the first width.

8 Claims, 14 Drawing Sheets

Related U.S. Application Data

(60) Provisional application No. 62/796,107, filed on Jan. 24, 2019.

(52) U.S. Cl.
CPC ....... *G02B 27/0172* (2013.01); *G02B 27/145* (2013.01); *G02B 2027/0178* (2013.01)

(56) References Cited

U.S. PATENT DOCUMENTS

| | | | |
|---|---|---|---|
| 2,886,911 A | 5/1959 | Hardesty | |
| 3,491,245 A | 1/1970 | Hardesty | |
| 3,626,394 A | 12/1971 | Nelson et al. | |
| 3,667,621 A | 6/1972 | Barlow | |
| 3,677,621 A | 7/1972 | Smith | |
| 3,737,212 A | 6/1973 | Antonson et al. | |
| 3,802,763 A | 4/1974 | Cook et al. | |
| 3,857,109 A | 12/1974 | Pilloff | |
| 3,873,209 A | 3/1975 | Schinke et al. | |
| 3,940,204 A | 2/1976 | Withrington | |
| 4,084,883 A | 4/1978 | Eastman et al. | |
| 4,191,446 A | 3/1980 | Arditty et al. | |
| 4,309,070 A | 1/1982 | St Leger Searle | |
| 4,331,387 A | 5/1982 | Wentz | |
| 4,516,828 A | 5/1985 | Steele | |
| 4,613,216 A | 9/1986 | Herbec et al. | |
| 4,711,512 A | 12/1987 | Upatnieks | |
| 4,715,684 A | 12/1987 | Gagnon | |
| 4,775,217 A | 10/1988 | Ellis | |
| 4,798,448 A | 1/1989 | Van Raalte | |
| 4,805,988 A | 2/1989 | Dones | |
| 4,932,743 A | 6/1990 | Isobe et al. | |
| 4,978,952 A | 12/1990 | Irwin | |
| 5,033,828 A | 7/1991 | Haruta | |
| 5,076,664 A | 12/1991 | Migozzi | |
| 5,096,520 A | 3/1992 | Faris | |
| 5,157,526 A | 10/1992 | Kondo et al. | |
| 5,231,642 A | 7/1993 | Scifres et al. | |
| 5,301,067 A | 4/1994 | Bleier et al. | |
| 5,353,134 A | 10/1994 | Michel et al. | |
| 5,367,399 A | 11/1994 | Kramer | |
| 5,369,415 A | 11/1994 | Richard et al. | |
| 5,453,877 A | 9/1995 | Gerbe et al. | |
| 5,543,877 A | 8/1996 | Takashi et al. | |
| 5,555,329 A | 9/1996 | Kuper et al. | |
| 5,619,601 A | 4/1997 | Akashi et al. | |
| 5,650,873 A | 7/1997 | Gal et al. | |
| 5,680,209 A | 10/1997 | Maechler | |
| 5,724,163 A | 3/1998 | David | |
| 5,751,480 A | 5/1998 | Kitagishi | |
| 5,764,412 A | 6/1998 | Suzuki et al. | |
| 5,829,854 A | 11/1998 | Jones | |
| 5,883,684 A | 3/1999 | Millikan et al. | |
| 5,896,232 A | 4/1999 | Budd et al. | |
| 5,919,601 A | 7/1999 | Nguyen et al. | |
| 5,966,223 A | 10/1999 | Yaakov et al. | |
| 5,982,536 A | 11/1999 | Swan | |
| 6,021,239 A | 2/2000 | Minami et al. | |
| 6,052,500 A | 4/2000 | Takano et al. | |
| 6,091,548 A | 7/2000 | Chen | |
| 6,144,347 A | 11/2000 | Mizoguchi et al. | |
| 6,222,676 B1 | 4/2001 | Togino et al. | |
| 6,322,256 B1 | 11/2001 | Inada et al. | |
| 6,324,330 B1 | 11/2001 | Stites | |
| 6,349,001 B1 | 2/2002 | Spitzer | |
| 6,362,861 B1 | 3/2002 | Hertz et al. | |
| 6,384,982 B1 | 5/2002 | Spitzer | |
| 6,388,814 B2 | 5/2002 | Tanaka | |
| 6,404,550 B1 | 6/2002 | Yajima | |
| 6,404,947 B1 | 6/2002 | Matsuda | |
| 6,490,104 B1 | 12/2002 | Gleckman et al. | |
| 6,509,982 B2 | 1/2003 | Steiner | |
| 6,542,307 B2 | 4/2003 | Gleckman | |
| 6,556,282 B2 | 4/2003 | Jamieson et al. | |
| 6,577,411 B1 | 6/2003 | David | |
| 6,580,529 B1 | 6/2003 | Amitai et al. | |
| 6,671,100 B1 | 12/2003 | McRuer | |
| 6,690,513 B2 | 2/2004 | Hulse et al. | |
| 6,710,902 B2 | 3/2004 | Takeyama | |
| 6,775,432 B2 | 8/2004 | Basu | |
| 6,791,760 B2 | 9/2004 | Janeczko et al. | |
| 6,798,579 B2 | 9/2004 | Robinson et al. | |
| 6,829,095 B2 ‡ | 12/2004 | Amitai | G02B 6/0018 359/629 |
| 6,942,925 B1 | 9/2005 | Lazarev et al. | |
| 7,016,113 B2 | 3/2006 | Choi et al. | |
| 7,021,777 B2 | 4/2006 | Amitai | |
| 7,088,664 B2 | 8/2006 | Kim et al. | |
| 7,175,304 B2 | 2/2007 | Wadia et al. | |
| 7,205,960 B2 | 4/2007 | David | |
| 7,355,795 B1 | 4/2008 | Yamazaki et al. | |
| 7,391,573 B2 | 6/2008 | Amitai | |
| 7,418,170 B2 | 8/2008 | Mukawa et al. | |
| 7,430,355 B2 | 9/2008 | Heikenfeld et al. | |
| 7,446,170 B2 | 11/2008 | Milovan et al. | |
| 7,457,040 B2 | 11/2008 | Amitai | |
| 7,577,326 B2 | 8/2009 | Amitai | |
| 7,643,214 B2 | 1/2010 | Amitai | |
| 7,672,055 B2 | 3/2010 | Amitai | |
| 7,724,443 B2 | 5/2010 | Amitai | |
| 7,751,122 B2 | 7/2010 | Amitai | |
| 7,778,508 B2 | 8/2010 | Hirayama | |
| 7,949,214 B2 | 5/2011 | Dejong | |
| 7,995,275 B2 | 8/2011 | Maeda et al. | |
| 8,000,020 B2 | 8/2011 | Amitai | |
| 8,004,765 B2 | 8/2011 | Amitai | |
| 8,035,872 B2 | 10/2011 | Ouchi | |
| 8,096,439 B2 | 1/2012 | Amitai et al. | |
| 8,405,573 B2 | 3/2013 | Lapidot et al. | |
| 8,432,614 B2 | 4/2013 | Amitai | |
| 8,643,948 B2 | 2/2014 | Amitai et al. | |
| 8,655,178 B2 | 2/2014 | Capron et al. | |
| 8,666,208 B1 | 3/2014 | Amirparviz et al. | |
| 8,736,963 B2 | 5/2014 | Robbins et al. | |
| 8,743,464 B1 | 6/2014 | Amirparviz | |
| 8,913,865 B1 | 12/2014 | Bennett | |
| 9,025,253 B2 | 5/2015 | Hadad et al. | |
| 9,248,616 B2 | 2/2016 | Amitai | |
| 9,551,880 B2 | 1/2017 | Amitai | |
| 9,568,738 B2 | 2/2017 | Mansharof et al. | |
| 9,804,396 B2 | 10/2017 | Amitai | |
| 9,805,633 B2 | 10/2017 | Zheng | |
| 9,933,684 B2 | 4/2018 | Brown et al. | |
| 10,048,499 B2 | 8/2018 | Amitai | |
| 10,437,066 B2 ‡ | 10/2019 | Dobschal | G02B 6/00 |
| 10,480,725 B2 | 11/2019 | Streppel | |
| 10,480,772 B2 ‡ | 11/2019 | Joiris | F21V 31/005 |
| 10,480,775 B2 ‡ | 11/2019 | Yamada | B60Q 3/745 |
| 2002/0015233 A1 | 2/2002 | Park | |
| 2002/0191297 A1 | 12/2002 | Gleckman et al. | |
| 2003/0007157 A1 | 1/2003 | Hulse et al. | |
| 2003/0020006 A1 | 1/2003 | Janeczko et al. | |
| 2003/0063042 A1 | 4/2003 | Friesem et al. | |
| 2003/0090439 A1 | 5/2003 | Spitzer et al. | |
| 2003/0165017 A1 | 9/2003 | Amitai | |
| 2003/0197938 A1 | 10/2003 | Schmidt et al. | |
| 2003/0218718 A1 | 11/2003 | Moliton et al. | |
| 2004/0032660 A1 | 2/2004 | Amitai | |
| 2004/0033528 A1 | 2/2004 | Amitai | |
| 2004/0085649 A1 | 5/2004 | Repetto et al. | |
| 2004/0137189 A1 | 7/2004 | Tellini et al. | |
| 2004/0233534 A1 | 11/2004 | Nakanishi et al. | |
| 2005/0018308 A1 | 1/2005 | Cassarly et al. | |
| 2005/0078388 A1 | 4/2005 | Amitai | |
| 2005/0083592 A1 | 4/2005 | Amitai | |
| 2005/0084210 A1 | 4/2005 | Cha | |
| 2005/0174641 A1 | 8/2005 | Greenberg | |
| 2005/0174658 A1 | 8/2005 | Long et al. | |
| 2005/0180687 A1 ‡ | 8/2005 | Amitai | G02B 6/003 385/31 |
| 2005/0265044 A1 | 12/2005 | Chen et al. | |
| 2006/0126182 A1 | 6/2006 | Levola | |
| 2006/0268421 A1 | 11/2006 | Shimizu et al. | |
| 2007/0070859 A1 | 3/2007 | Hirayama | |

(56) References Cited

U.S. PATENT DOCUMENTS

| | | |
|---|---|---|
| 2007/0086712 A1‡ | 4/2007 | Shani .................. G02B 6/0028 385/101 |
| 2007/0091445 A1 | 4/2007 | Amitai |
| 2007/0097513 A1 | 5/2007 | Amitai |
| 2007/0155277 A1 | 7/2007 | Amitai |
| 2008/0025667 A1 | 1/2008 | Amitai |
| 2008/0094586 A1 | 4/2008 | Hirayama |
| 2008/0106775 A1 | 5/2008 | Amitai et al. |
| 2008/0151379 A1 | 6/2008 | Amitai |
| 2008/0186604 A1 | 8/2008 | Amitai |
| 2008/0198471 A1 | 8/2008 | Amitai |
| 2008/0278812 A1 | 11/2008 | Amitai |
| 2008/0285140 A1 | 11/2008 | Amitai |
| 2009/0052046 A1 | 2/2009 | Amitai |
| 2009/0052047 A1 | 2/2009 | Amitai |
| 2009/0097127 A1 | 4/2009 | Amitai |
| 2009/0122414 A1‡ | 5/2009 | Amitai ................ G02B 27/0172 359/633 |
| 2009/0153437 A1 | 6/2009 | Aharoni |
| 2009/0190222 A1 | 7/2009 | Simmonds et al. |
| 2010/0067110 A1 | 3/2010 | Amitai et al. |
| 2010/0111472 A1 | 5/2010 | DeJong |
| 2010/0171680 A1 | 7/2010 | Lapidot et al. |
| 2010/0202128 A1 | 8/2010 | Saccomanno |
| 2010/0278480 A1 | 11/2010 | Vasylyev et al. |
| 2010/0291489 A1 | 11/2010 | Moskovits et al. |
| 2012/0039576 A1 | 2/2012 | Dangel et al. |
| 2012/0147361 A1 | 6/2012 | Mochizuki et al. |
| 2012/0179369 A1 | 6/2012 | Lapidot et al. |
| 2012/0206817 A1‡ | 8/2012 | Totani ................ G02B 27/0172 359/633 |
| 2013/0229717 A1 | 9/2013 | Amitai |
| 2013/0276960 A1 | 10/2013 | Amitai |
| 2013/0279017 A1 | 10/2013 | Amitai |
| 2013/0321432 A1 | 12/2013 | Burns et al. |
| 2013/0334504 A1 | 12/2013 | Thompson et al. |
| 2013/0335975 A1‡ | 12/2013 | Park .................... G02B 6/0055 362/297 |
| 2014/0003762 A1 | 1/2014 | Macnamara |
| 2014/0043688 A1 | 2/2014 | Schrader et al. |
| 2014/0118613 A1 | 5/2014 | Amitai et al. |
| 2014/0118836 A1 | 5/2014 | Amitai et al. |
| 2014/0118837 A1 | 5/2014 | Amitai et al. |
| 2014/0126051 A1 | 5/2014 | Amitai et al. |
| 2014/0126052 A1 | 5/2014 | Amitai et al. |
| 2014/0126056 A1 | 5/2014 | Amitai et al. |
| 2014/0126057 A1 | 5/2014 | Amitai et al. |
| 2014/0126175 A1 | 5/2014 | Amitai et al. |
| 2014/0185142 A1 | 7/2014 | Gupta et al. |
| 2014/0226215 A1 | 8/2014 | Komatsu et al. |
| 2015/0016777 A1 | 1/2015 | Abovitz et al. |
| 2015/0081313 A1 | 3/2015 | Boross et al. |
| 2015/0138451 A1 | 5/2015 | Amitai |
| 2015/0138646 A1 | 5/2015 | Tatsugi |
| 2015/0160529 A1 | 6/2015 | Popovich et al. |
| 2015/0198805 A1 | 7/2015 | Mansharof et al. |
| 2015/0205140 A1 | 7/2015 | Mansharof et al. |
| 2015/0205141 A1 | 7/2015 | Mansharof et al. |
| 2015/0219834 A1 | 8/2015 | Nichol et al. |
| 2015/0277127 A1 | 10/2015 | Amitai |
| 2015/0293360 A1 | 10/2015 | Amitai |
| 2015/0338655 A1 | 11/2015 | Sawada et al. |
| 2016/0116743 A1 | 4/2016 | Amitai |
| 2016/0170212 A1 | 6/2016 | Amitai |
| 2016/0170213 A1 | 6/2016 | Amitai |
| 2016/0170214 A1 | 6/2016 | Amitai |
| 2016/0187656 A1 | 6/2016 | Amitai |
| 2016/0234485 A1 | 8/2016 | Robbins et al. |
| 2016/0341964 A1 | 11/2016 | Amitai |
| 2016/0349518 A1 | 12/2016 | Amitai et al. |
| 2017/0045744 A1 | 2/2017 | Amitai |
| 2017/0052376 A1 | 2/2017 | Amitai |
| 2017/0052377 A1 | 2/2017 | Amitai |
| 2017/0075119 A1 | 3/2017 | Schultz et al. |
| 2017/0242249 A1 | 8/2017 | Wall |
| 2017/0315358 A1‡ | 11/2017 | Masuda ............. G02B 27/0172 |
| 2017/0336636 A1 | 11/2017 | Amitai et al. |
| 2017/0343822 A1 | 11/2017 | Border et al. |
| 2017/0357095 A1 | 12/2017 | Amitai |
| 2017/0363799 A1 | 12/2017 | Ofir et al. |
| 2017/0371160 A1 | 12/2017 | Schultz |
| 2018/0039082 A1 | 2/2018 | Amitai |
| 2018/0067315 A1 | 3/2018 | Amitai et al. |
| 2018/0157057 A1 | 6/2018 | Gelberg et al. |
| 2018/0210202 A1‡ | 7/2018 | Danziger ................ G02B 6/10 |
| 2018/0267317 A1 | 9/2018 | Amitai |
| 2018/0275384 A1 | 9/2018 | Danziger et al. |
| 2018/0284448 A1‡ | 10/2018 | Matsuki ............. G02B 6/0055 |
| 2018/0292592 A1‡ | 10/2018 | Danziger ................ G02B 5/18 |
| 2018/0292599 A1 | 10/2018 | Ofir et al. |
| 2018/0373039 A1 | 12/2018 | Amitai |
| 2019/0011710 A1 | 1/2019 | Amitai |
| 2019/0056600 A1 | 2/2019 | Danziger et al. |
| 2019/0064518 A1 | 2/2019 | Danziger |
| 2019/0155035 A1 | 5/2019 | Amitai |
| 2019/0170327 A1 | 6/2019 | Eisenfeld et al. |
| 2019/0208187 A1 | 7/2019 | Danziger |
| 2019/0212487 A1 | 7/2019 | Danziger et al. |
| 2019/0227215 A1 | 7/2019 | Danziger et al. |
| 2019/0278086 A1 | 9/2019 | Ofir |
| 2019/0285900 A1 | 9/2019 | Amitai |
| 2019/0293856 A1 | 9/2019 | Danziger |
| 2019/0339530 A1 | 11/2019 | Amitai |
| 2019/0346609 A1 | 11/2019 | Eisenfeld |
| 2019/0361240 A1 | 11/2019 | Gelberg |
| 2019/0361241 A1 | 11/2019 | Amitai |
| 2019/0377187 A1 | 12/2019 | Rubin et al. |
| 2019/0391408 A1 | 12/2019 | Mansharof |
| 2020/0033572 A1 | 1/2020 | Danziger et al. |
| 2020/0041713 A1 | 2/2020 | Danziger |
| 2020/0081246 A1‡ | 3/2020 | Olkkonen ............ G02B 5/1823 |
| 2020/0089001 A1 | 3/2020 | Amitai et al. |
| 2020/0110211 A1 | 4/2020 | Danziger et al. |
| 2020/0120329 A1 | 4/2020 | Danziger |
| 2020/0133008 A1 | 4/2020 | Amitai |
| 2020/0150330 A1 | 5/2020 | Danziger et al. |
| 2020/0183159 A1 | 6/2020 | Danziger |
| 2020/0183170 A1 | 6/2020 | Amitai et al. |
| 2020/0200963 A1 | 6/2020 | Eisenfeld et al. |
| 2020/0209667 A1 | 7/2020 | Sharlin et al. |
| 2020/0241308 A1 | 7/2020 | Danziger et al. |
| 2020/0249481 A1 | 8/2020 | Danziger et al. |
| 2020/0278557 A1 | 9/2020 | Greenstein et al. |
| 2020/0285060 A1 | 9/2020 | Amitai |
| 2020/0292417 A1 | 9/2020 | Lobachinsky et al. |
| 2020/0292744 A1 | 9/2020 | Danziger |
| 2020/0292819 A1 | 9/2020 | Danziger et al. |
| 2020/0310024 A1 | 10/2020 | Danziger et al. |
| 2020/0326545 A1 | 10/2020 | Amitai et al. |
| 2020/0371311 A1 | 11/2020 | Lobachinsky et al. |
| 2021/0003849 A1 | 1/2021 | Amitai et al. |
| 2021/0018755 A1 | 1/2021 | Amitai |
| 2021/0033773 A1 | 2/2021 | Danziger et al. |
| 2021/0033774 A1 | 2/2021 | Tanaka |
| 2021/0033862 A1 | 2/2021 | Danziger et al. |
| 2021/0033872 A1 | 2/2021 | Rubin et al. |
| 2021/0055218 A1 | 2/2021 | Aldaag et al. |
| 2021/0055466 A1 | 2/2021 | Eisenfeld |
| 2021/0055561 A1 | 2/2021 | Danziger et al. |
| 2021/0063733 A1 | 3/2021 | Ronen |
| 2021/0072553 A1 | 3/2021 | Danziger et al. |
| 2021/0099691 A1 | 4/2021 | Danziger |
| 2021/0109351 A1 | 4/2021 | Danziger et al. |
| 2021/0116367 A1 | 4/2021 | Gelberg et al. |
| 2021/0141141 A1 | 5/2021 | Danziger et al. |
| 2021/0157150 A1 | 5/2021 | Amitai |
| 2021/0165231 A1 | 6/2021 | Gelberg et al. |
| 2021/0239898 A1 | 8/2021 | Danziger et al. |

FOREIGN PATENT DOCUMENTS

| | | |
|---|---|---|
| DE | 1422172 | 11/1970 |
| DE | 19725262 | 12/1998 |
| DE | 102013106392 | 12/2014 |

(56) References Cited

FOREIGN PATENT DOCUMENTS

| | | |
|---|---|---|
| EP | 0365406 | 4/1990 |
| EP | 0380035 | 8/1990 |
| EP | 0399865 | 11/1990 |
| EP | 0543718 | 5/1993 |
| EP | 0566004 | 10/1993 |
| EP | 1158336 | 11/2001 |
| EP | 1180711 | 2/2002 |
| EP | 1326102 | 7/2003 |
| EP | 1385023 | 1/2004 |
| EP | 1485747 | 12/2004 |
| EP | 1562066 | 8/2005 |
| EP | 0770818 | 4/2007 |
| EP | 1779159 | 5/2007 |
| EP | 2530510 | 12/2012 |
| FR | 2496905 | 6/1982 |
| FR | 2638242 | 4/1990 |
| FR | 2721872 | 1/1996 |
| GB | 2220081 | 12/1989 |
| GB | 2272980 | 6/1994 |
| GB | 2278222 | 11/1994 |
| GB | 2278888 | 12/1994 |
| JP | 2002539498 | 11/2002 |
| JP | 2003140081 | 5/2003 |
| JP | 2003536102 | 12/2003 |
| JP | 2004527801 | 9/2004 |
| JP | 2005084522 | 3/2005 |
| JP | 2011-028141 | 2/2011 |
| TW | 201809798 | 3/2018 |
| WO | 9510106 | 4/1995 |
| WO | 9815868 | 4/1998 |
| WO | 9952002 | 10/1999 |
| WO | 0004407 | 1/2000 |
| WO | 0063738 | 10/2000 |
| WO | 0127685 | 4/2001 |
| WO | 0195025 | 12/2001 |
| WO | 0195027 | 12/2001 |
| WO | 02082168 | 10/2002 |
| WO | 03058320 | 7/2003 |
| WO | 03081320 | 10/2003 |
| WO | 2004109349 | 12/2004 |
| WO | 2005024485 | 3/2005 |
| WO | 2005024491 | 3/2005 |
| WO | 2005024969 | 3/2005 |
| WO | 2005093493 | 10/2005 |
| WO | 2005124427 | 12/2005 |
| WO | 2006013565 | 2/2006 |
| WO | 2006085308 | 8/2006 |
| WO | 2006085309 | 8/2006 |
| WO | 2006085310 | 8/2006 |
| WO | 2006087709 | 8/2006 |
| WO | 2006098097 | 9/2006 |
| WO | 2007054928 | 5/2007 |
| WO | 2007093983 | 8/2007 |
| WO | 2008023367 | 2/2008 |
| WO | 2008129539 | 10/2008 |
| WO | 2008149339 | 12/2008 |
| WO | 2009009268 | 1/2009 |
| WO | 2009074638 | 6/2009 |
| WO | 2011130720 | 10/2011 |
| WO | 2013065656 | 5/2013 |
| WO | 2013175465 | 11/2013 |
| WO | 2015081313 | 6/2015 |
| WO | 2016103251 | 6/2016 |
| WO | 2016132347 | 8/2016 |
| WO | 2017106873 | 6/2017 |
| WO | 2017199232 | 11/2017 |
| WO | WO-WO-2018206848 A1 ‡ | 11/2018 ......... G02B 27/4272 |

‡ imported from a related application

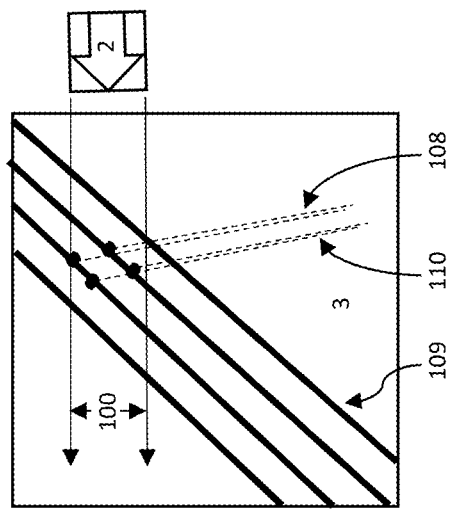
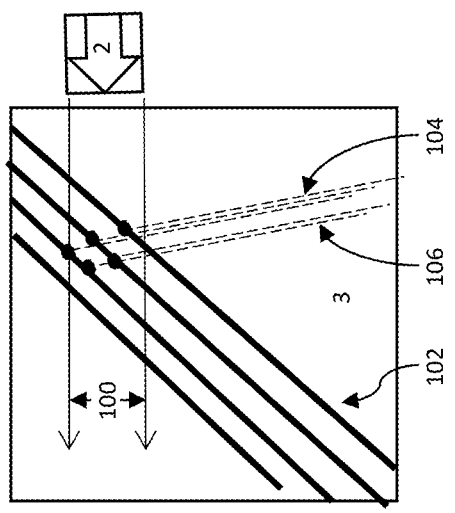

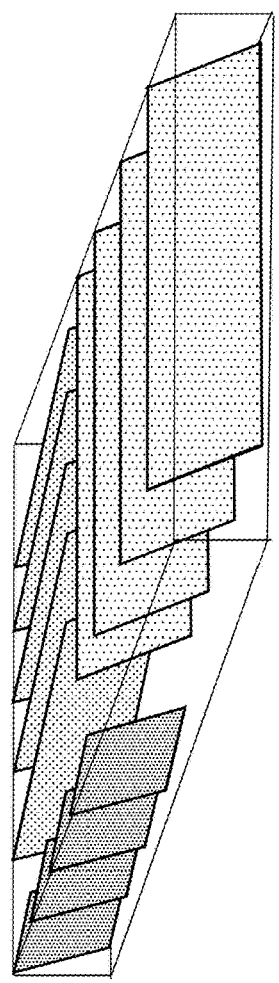
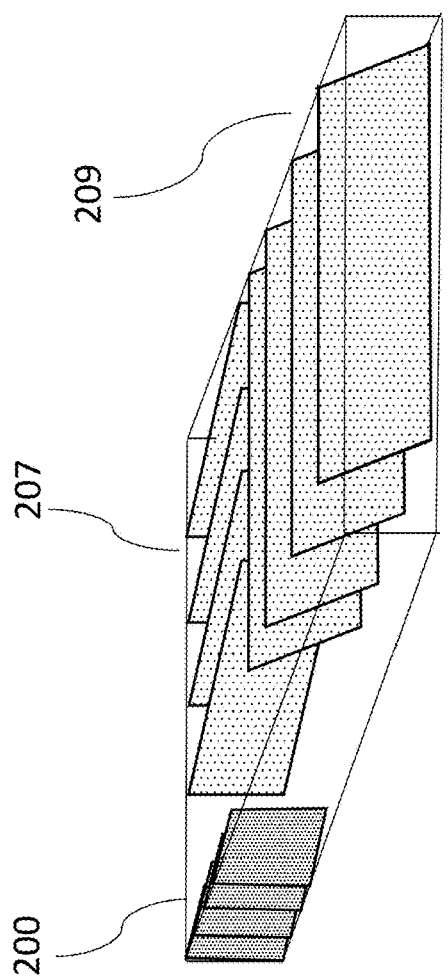
FIG. 4B
FIG. 4C
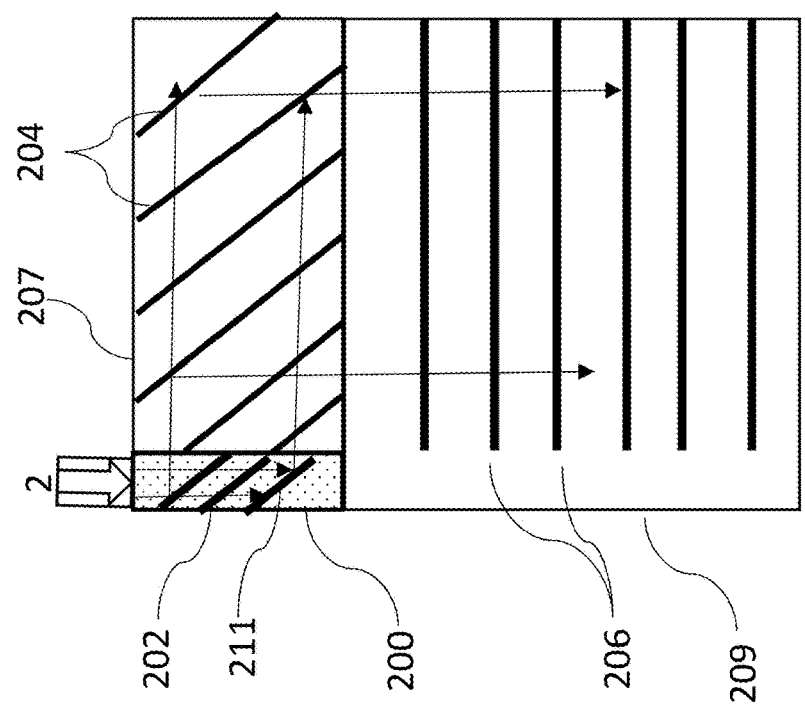
FIG. 4A

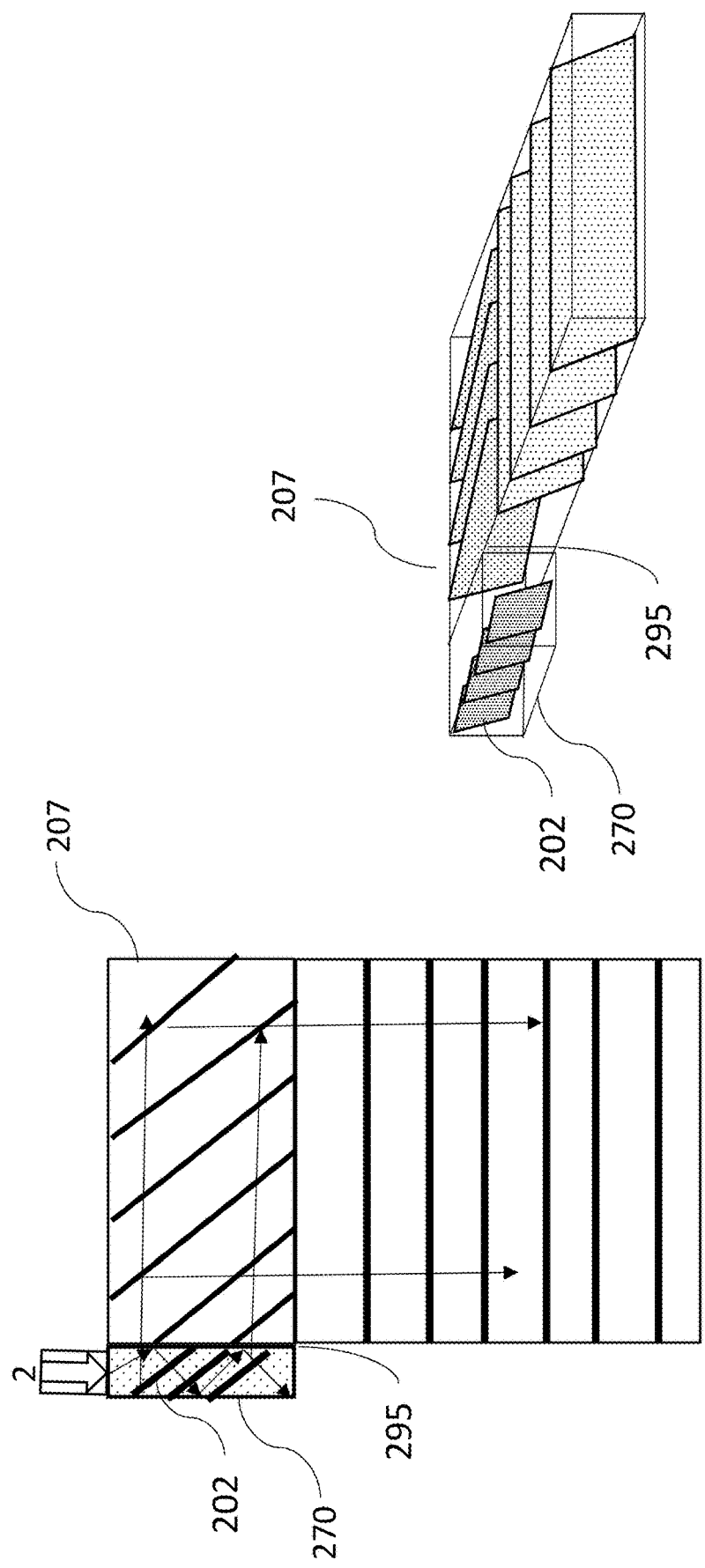

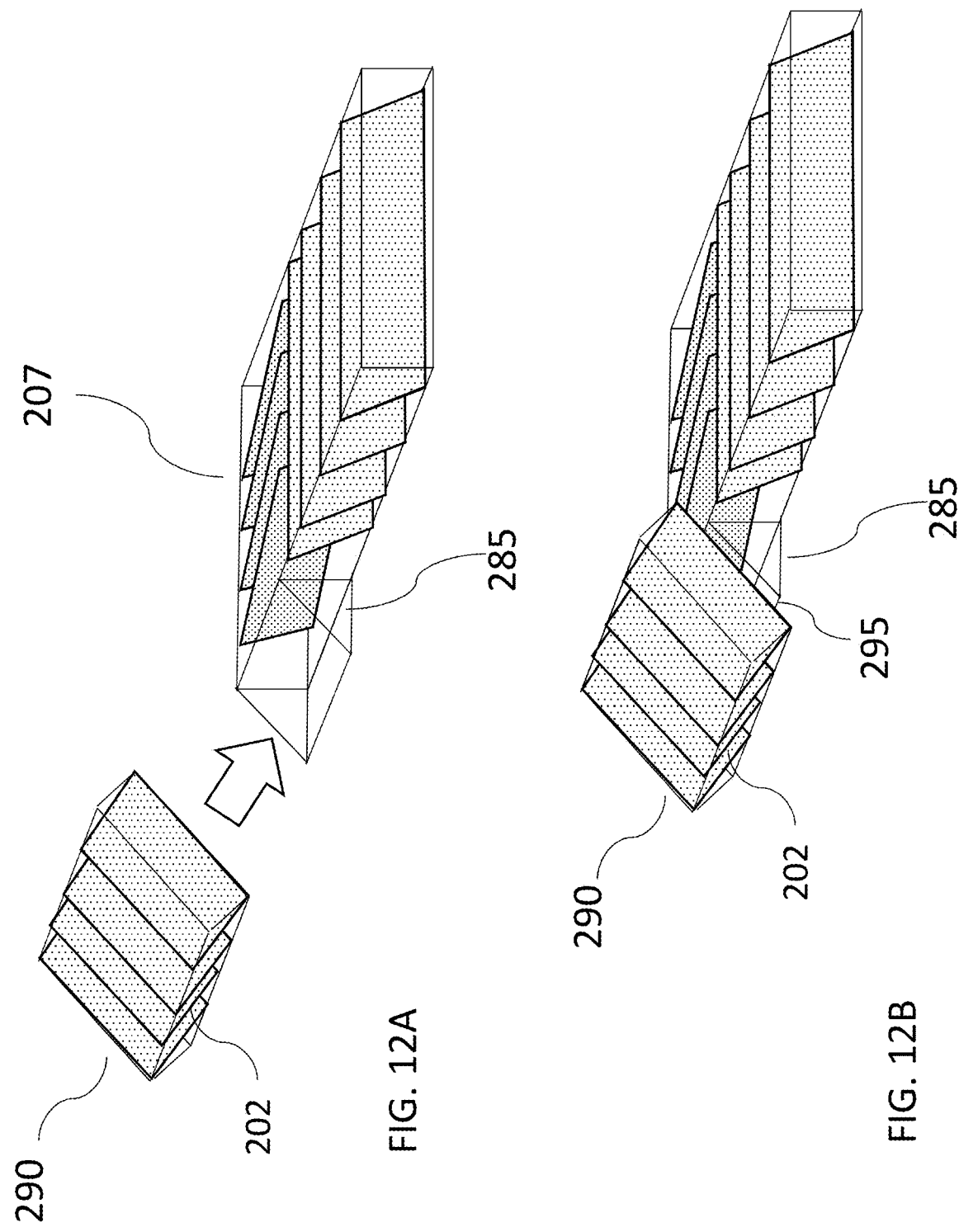

OPTICAL SYSTEMS INCLUDING LIGHT-GUIDE OPTICAL ELEMENTS WITH TWO-DIMENSIONAL EXPANSION

FIELD AND BACKGROUND OF THE INVENTION

The present invention relates to optical systems and, in particular, it concerns an optical system including a light-guide optical element (LOE) for achieving optical aperture expansion.

Many near-eye display systems include a transparent light-guide optical element (LOE) or "waveguide" placed before the eye of the user, which conveys an image within the LOE by internal reflection and then couples out the image by a suitable output coupling mechanism towards the eye of the user. The output coupling mechanism may be based on embedded partial reflectors or "facets", or may employ a diffractive pattern. The description below will refer primarily to a facet-based coupling-out arrangement, but it should be appreciated that various features of the invention are also applicable to diffractive arrangements.

Two-dimensional aperture expansion within a waveguide employing internal orthogonal facets was described in FIG. 13 of U.S. Pat. No. 6,829,095 B2, which is reproduced here as FIG. 1A. Reference numerals referring to the prior art drawings are presented here in parentheses. Light from projector (20) propagates within the waveguide and is reflected by facets (22a)-(22c) towards facets (23), which couple the light out towards an observer.

PCT publication WO 2019/142177 A1 discloses a similar concept employing non-orthogonal facets. FIGS. 2 and 29 of the PCT publication are reproduced here as FIGS. 1B and 1C, respectively. The first set of facets, here denoted (32), are non-orthogonal, so only one mode of propagation is reflected. The two configurations illustrated differ as to whether the regions containing the two sets of facets are overlapping (FIG. 1B) or non-overlapping (FIG. 1C).

SUMMARY OF THE INVENTION

The present invention is an optical system.

According to the teachings of an embodiment of the present invention there is provided, an optical system for directing image illumination injected at a coupling-in region towards a user for viewing, the optical system comprising a light-guide optical element (LOE) formed from transparent material, the LOE comprising: (a) a first region containing a first set of planar, mutually-parallel, partially-reflecting surfaces having a first orientation; (b) a second region containing a second set of planar, mutually-parallel, partially-reflecting surfaces having a second orientation non-parallel to the first orientation; (c) a set of mutually-parallel major external surfaces, the major external surfaces extending across the first and second regions such that both the first set of partially-reflecting surfaces and the second set of partially-reflecting surfaces are located between the major external surfaces, wherein the second set of partially-reflecting surfaces are at an oblique angle to the major external surfaces so that a part of image illumination propagating within the LOE by internal reflection at the major external surfaces from the first region into the second region is coupled out of the LOE towards the user, and wherein the first set of partially-reflecting surfaces are oriented so that a part of image illumination propagating within the LOE by internal reflection at the major external surfaces from the coupling-in region is deflected towards the second region, wherein the optical system further comprises a third set of planar, mutually-parallel, at least partially-reflecting surfaces deployed at the coupling-in region, the third set of at least partially-reflecting surfaces being deployed to receive image illumination injected from a projector with an optical aperture having a first width measured parallel to the major external surfaces and to direct the image illumination via reflection of at least part of the image illumination at the third set of at least partially-reflective facets towards the first set of partially-reflective facets with an effective optical aperture having a second width measured parallel to the major external surfaces, the second width being larger than the first width.

According to a further feature of an embodiment of the present invention, the third set of at least partially-reflecting surfaces has a first sequence of successively-increasing reflectivities in an order in which the image illumination reaches them, and wherein the first set of partially-reflecting surfaces has a second sequence of successively-increasing reflectivities in an order in which the image illumination reaches them, the second sequence starting at a reflectivity smaller than a last reflectivity of the first sequence.

According to a further feature of an embodiment of the present invention, a last reflectivity of the first sequence of successively-increasing reflectivities is greater than 90%.

According to a further feature of an embodiment of the present invention, a majority of the image illumination directed towards the first set of partially-reflecting surfaces undergoes exactly one reflection from the third set of at least partially-reflecting surfaces.

According to a further feature of an embodiment of the present invention, a majority of the image illumination directed towards the first set of partially-reflecting surfaces undergoes two reflections from the third set of at least partially-reflecting surfaces.

According to a further feature of an embodiment of the present invention, the third set of at least partially-reflecting surfaces are integrated as part of the LOE and located between the major external surfaces.

According to a further feature of an embodiment of the present invention, the third set of at least partially-reflecting surfaces are parallel to the first set of partially-reflecting surfaces.

According to a further feature of an embodiment of the present invention, the third set of at least partially-reflecting surfaces are non-parallel to the first set of partially-reflecting surfaces.

According to a further feature of an embodiment of the present invention, an inter-surface spacing of the third set of at least partially-reflecting surfaces is smaller than an inter-surface spacing of the first set of partially-reflecting surfaces.

According to a further feature of an embodiment of the present invention, a surface area of each at least partially-reflecting surface of the third set of at least partially-reflecting surfaces is smaller than a surface area of each partially-reflecting surface of the first set of partially-reflecting surfaces.

According to a further feature of an embodiment of the present invention, the first region and the second region are non-overlapping.

According to a further feature of an embodiment of the present invention, there is also provided an image projector for projecting a collimated image having an angular field of view about an optical axis, the image projector being optically coupled to the LOE so as to introduce the collimated image into the LOE via the third set of at least partially-reflecting surfaces at the coupling-in region as a propagating image propagating within the LOE by internal reflection at the major external surfaces, the propagating image being partially reflected by the first set of partially-reflecting surfaces to generate a deflected propagating image propagating within the LOE by internal reflection at the major external surfaces, the deflected propagating image being partially reflected by the second set of partially-reflecting surfaces to generate a coupled-out image directed outwards from one of the major external surfaces towards the user.

BRIEF DESCRIPTION OF THE DRAWINGS

The invention is herein described, by way of example only, with reference to the accompanying drawings, wherein:

FIGS. 3A and 3B are schematic illustrations of the effects of different spacing of partially-reflecting internal surfaces on redirection of image illumination from a projector with a given optical aperture width from a first direction to a second direction within a substrate;

FIG. 4A is a schematic front view of a light-guide optical element (LOE) according to the teachings of an embodiment of the present invention, illustrating three-stage expansion of an optical aperture from a projector to illumination coupled-out towards a viewer;

FIGS. 4B and 4C are schematic isometric representations of two implementations of the LOE of FIG. 4A using partially-reflecting internal surfaces that are orthogonal and oblique, respectively, for the first two stages of aperture expansion;

FIGS. 10A and 10B are schematic front and isometric views, respectively, of a further variant implementation of the LOE of FIG. 4A employing a rectangular waveguide section for a preliminary stage of optical aperture expansion;

FIGS. 12A and 12B are schematic isometric views before and after assembly, respectively, of a further variant implementation of the LOE of FIG. 4A employing a slab with internal at least partially-reflecting facets for a preliminary stage of optical aperture expansion with light guiding by surfaces non-parallel with the major surfaces of the LOE.

DESCRIPTION OF THE PREFERRED EMBODIMENTS

Certain embodiments of the present invention provide an optical system including a light-guide optical element (LOE) for achieving optical aperture expansion for the purpose of a head-up display, such as a near-eye display, which may be a virtual reality display, or more preferably an augmented reality display.

Figure 1A:
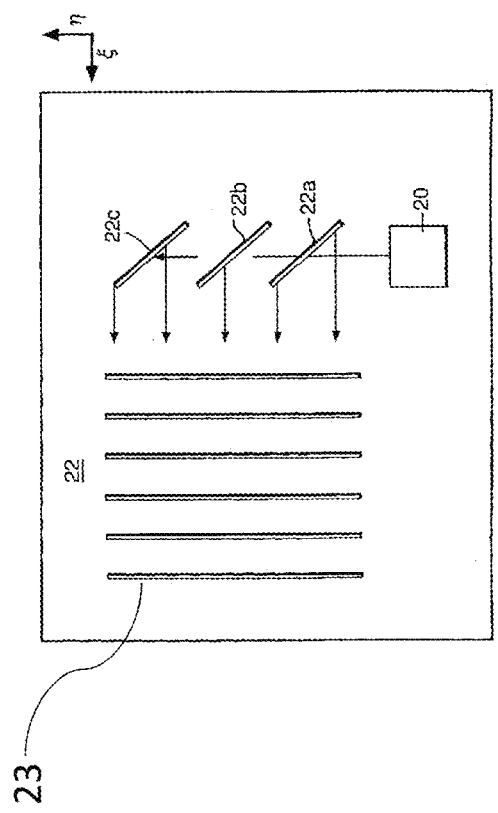
FIG. 1A, discussed above, corresponds to FIG. 13 of U.S. Pat. No. 6,829,095 B2.
Figure 1C:
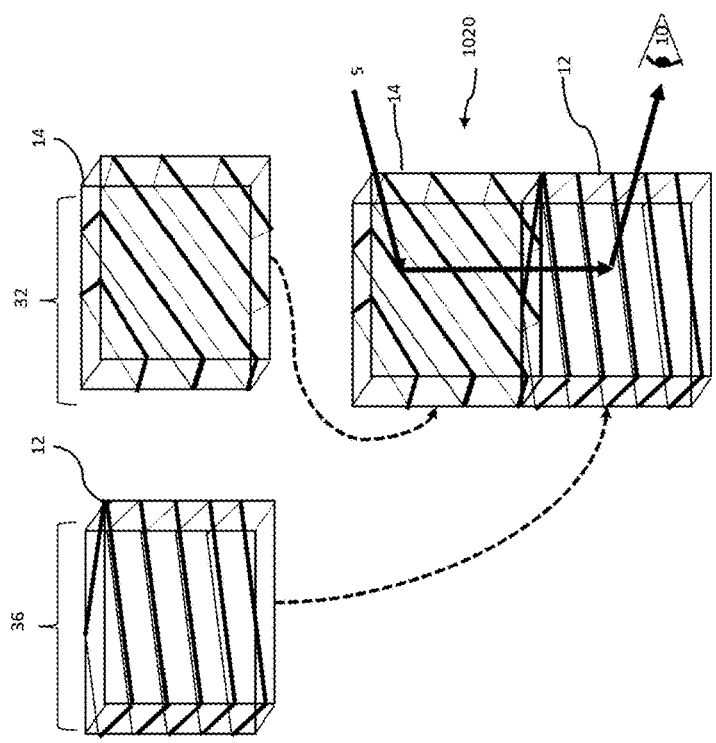
FIGS. 1B and 1C, discussed above, correspond to FIGS. 2 and 29 of PCT Patent Application Publication No. WO 2019/142177 A1, respectively.
Figure 1B:
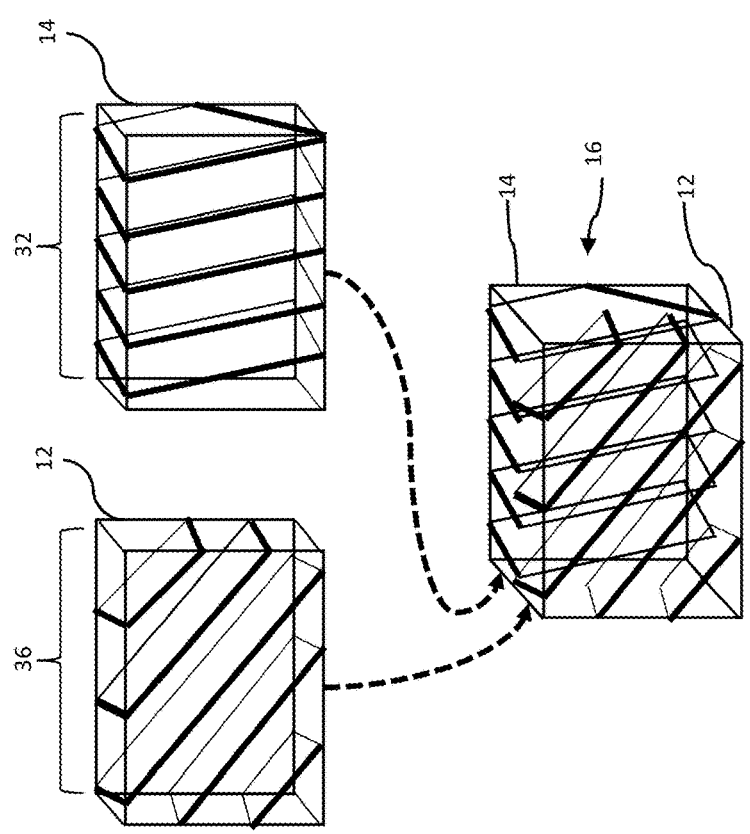
Figure 2A:
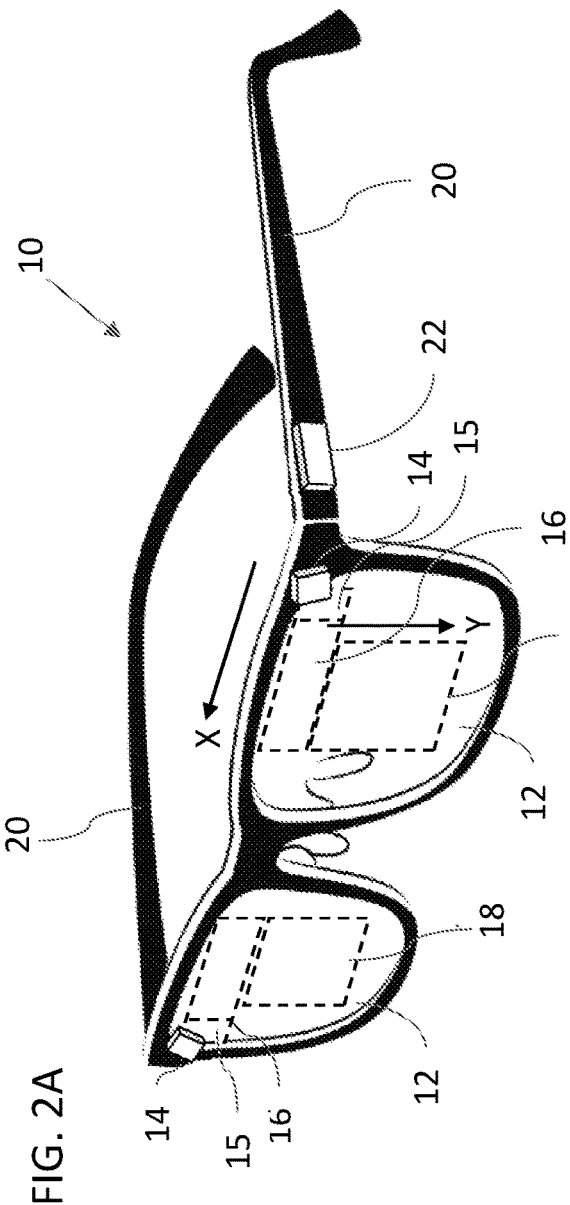
FIGS. 2A and 2B are schematic isometric views of an optical system implemented using a light-guide optical element (LOE), constructed and operative according to the teachings of the present invention, illustrating a top-down and a side-injection configuration, respectively.
Figure 2B:
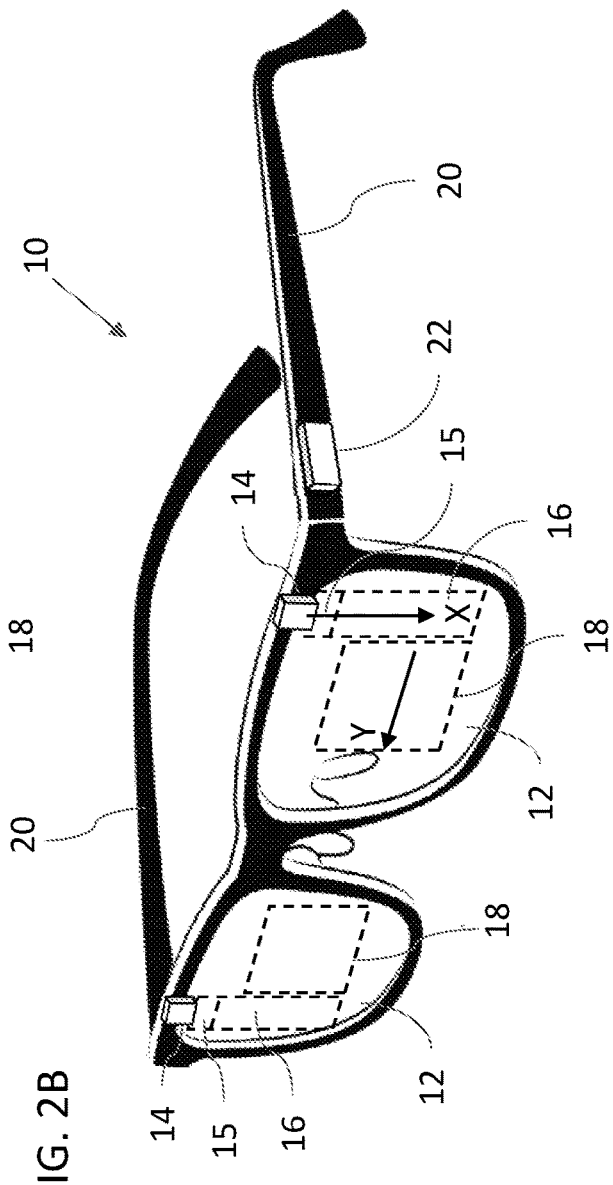

An exemplary implementation of a device in the form of a near-eye display, generally designated 10, employing an LOE 12 according to the teachings of an embodiment of the present invention, is illustrated schematically in FIGS. 2A and 2B. The near-eye display 10 employs a compact image projector (or "POD") 14 optically coupled so as to inject an image into LOE (interchangeably referred to as a "waveguide," a "substrate" or a "slab") 12 within which the image light is trapped in one dimension by internal reflection at a set of mutually-parallel planar external surfaces. The light impinges of a set of partially-reflecting surfaces (interchangeably referred to as "facets") that are parallel to each other, and inclined obliquely to the direction of propagation of the image light, with each successive facet deflecting a proportion of the image light into a deflected direction, also trapped/guided by internal reflection within the substrate. This first set of facets are not illustrated individually in FIGS. 2A and 2B, but are located in a first region of the LOE designated 16. This partial reflection at successive facets achieves a first dimension of optical aperture expansion.

In a first set of preferred but non-limiting examples of the present invention, the aforementioned set of facets are orthogonal to the major external surfaces of the substrate. In this case, both the injected image and its conjugate undergoing internal reflection as it propagates within region 16 are deflected and become conjugate images propagating in a deflected direction. In an alternative set of preferred but non-limiting examples, the first set of partially-reflecting surfaces are obliquely angled relative to the major external surfaces of the LOE. In the latter case, either the injected image or its conjugate forms the desired deflected image propagating within the LOE, while the other reflection may be minimized, for example, by employing angularly-selective coatings on the facets which render them relatively transparent to the range of incident angles presented by the image whose reflection is not needed.

The first set of partially-reflecting surfaces deflect the image illumination from a first direction of propagation trapped by total internal reflection (TIR) within the substrate to a second direction of propagation, also trapped by TIR within the substrate.

The deflected image illumination then passes into a second substrate region 18, which may be implemented as an adjacent distinct substrate or as a continuation of a single substrate, in which a coupling-out arrangement (either a further set of partially reflective facets or a diffractive optical element) progressively couples out a proportion of the image illumination towards the eye of an observer located within a region defined as the eye-motion box (EMB), thereby achieving a second dimension of optical aperture expansion. The overall device may be implemented separately for each eye, and is preferably supported relative to the head of a user with the each LOE 12 facing a corresponding eye of the user. In one particularly preferred option as illustrated here, a support arrangement is implemented as an eye glasses frame with sides 20 for supporting the device relative to ears of the user. Other forms of support arrangement may also be used, including but not limited to, head bands, visors or devices suspended from helmets.

It is a particularly preferred feature of certain embodiments of the present invention that the optical system further includes a third set of planar, mutually-parallel, at least partially-reflecting surfaces ("facets") deployed at the coupling-in region. The third set of facets are not shown individually in FIGS. 2A and 2B, but are designated by region 15. The third set of facets are deployed to receive image illumination injected from projector 14 with an optical aperture having a first width measured parallel to the major external surfaces of the LOE 12 and to direct the image illumination via reflection of at least part of the image illumination by the facets in region 15 towards the first set of partially-reflective facets in region 16 with an effective optical aperture having a second, larger width measured parallel to the major external surfaces of the LOE. The significance of this aperture expansion will be discussed further below.

The third set of facets 15 are interposed in the optical path between projector 14 and first set of facets 16 at the coupling region. The phrase "at the coupling region" is used herein to encompass both a case in which the third set of facets are incorporated into the LOE at the coupling region and where the third set of facets are external to the LOE, with both of these options being exemplified in detail below.

Reference is made herein in the drawings and claims to an X axis which extends horizontally (FIG. 2A) or vertically (FIG. 2B), in the general extensional direction of the first region of the LOE, and a Y axis which extends perpendicular thereto, i.e., vertically in FIG. 2A and horizontally in FIG. 2B.

In very approximate terms, the first LOE, or first region 16 of LOE 12, may be considered to achieve aperture expansion in the X direction while the second LOE, or second region 18 of LOE 12, achieves aperture expansion in the Y direction. It should be noted that the orientation as illustrated in FIG. 2A may be regarded as a "top-down" implementation, where the image illumination entering the main (second region) of the LOE enters from the top edge, whereas the orientation illustrated in FIG. 2B may be regarded as a "side-injection" implementation, where the axis referred to here as the Y axis is deployed horizontally. In the remaining drawings, the various features of certain embodiments of the present invention will be illustrated in the context of a "top-down" orientation, similar to FIG. 2A. However, it should be appreciated that all of those features are equally applicable to side-injection implementations, which also fall within the scope of the invention. In certain cases, other intermediate orientations are also applicable, and are included within the scope of the present invention except where explicitly excluded.

The POD employed with the devices of the present invention is preferably configured to generate a collimated image, i.e., in which the light of each image pixel is a parallel beam, collimated to infinity, with an angular direction corresponding to the pixel position. The image illumination thus spans a range of angles corresponding to an angular field of view in two dimensions.

Image projector 14 includes at least one light source, typically deployed to illuminate a spatial light modulator, such as an LCOS chip. The spatial light modulator modulates the projected intensity of each pixel of the image, thereby generating an image. Alternatively, the image projector may include a scanning arrangement, typically implemented using a fast-scanning mirror, which scans illumination from a laser light source across an image plane of the projector while the intensity of the beam is varied synchronously with the motion on a pixel-by-pixel basis, thereby projecting a desired intensity for each pixel. In both cases, collimating optics are provided to generate an output projected image which is collimated to infinity. Some or all of the above components are typically arranged on surfaces of one or more polarizing beam-splitter (PBS) cube or other prism arrangement, as is well known in the art.

Optical coupling of image projector 14 to LOE 12 may be achieved by any suitable optical coupling, such as for example via a coupling prism with an obliquely angled input surface, or via a reflective coupling arrangement, via a side edge and/or one of the major external surfaces of the LOE. Where third set of facets 15 is external to the LOE, the third set of facets are preferably integrated with the coupling-in arrangement, as will be exemplified below with reference to FIGS. 11A-11C, below. Further details of the coupling-in configuration are not critical to the invention, and are shown here only schematically.

It will be appreciated that the near-eye display 10 includes various additional components, typically including a controller 22 for actuating the image projector 14, typically employing electrical power from a small onboard battery (not shown) or some other suitable power source. It will be appreciated that controller 22 includes all necessary electronic components such as at least one processor or processing circuitry to drive the image projector, all as is known in the art.

Turning now to FIGS. 3A and 3B, this illustrates schematically the geometry of image illumination from a projector having a certain width of optical aperture with the first set of partially-reflecting internal surfaces. In order to obtain uniform light illumination, the width of the projector's aperture 100 must be such that the reflected rays from one facet are contiguous with the reflected rays from the next facet to avoid black lines in the display. In some cases, it is desirable that there is sufficient overlap that each viewing direction receives a reflection from two or more facets, and most preferably from a constant number of facets across the aperture, thereby enhancing uniformity of the viewed image. FIGS. 3A and 3B illustrate cases in which different number of facets (102 and 109) are illuminated by a beam from projector 2 with aperture width 100. The reflected light (104, 106, 110 and 108) propagates toward the other facets (not shown in this figure). Preferably a complete and constant number of facets are illuminated. In FIG. 3A the number varies between 2 and 3, while in FIG. 3B it is constant, with two facets contributing to the output across the entire aperture. The wider the aperture 100, the more facets are illuminated the more uniform is the image transmitted.

For a predefined facet spacing the aperture width must be modified accordingly to generate a uniform image. A large facet spacing therefore dictates use of a large aperture. Tight spacing of facets across waveguide increases production complexity and cost. On the other hand, producing a large aperture projector increases projector size. These conflicting design considerations are reconciled according to an aspect of the present invention by performing a preliminary stage of optical aperture expansion between the projector and what was referred to above as the first set of facets. This is achieved using an additional set of facets (referred to herein as the "third set of at least partially-reflecting internal surfaces").

FIG. 4A shows schematically a front view of a waveguide according to this aspect of the present invention. The aperture of projector 2 is small. The two arrows originating from this projector represent light rays of the edges of this aperture. The light from this projector is coupled into waveguide section 200 having facets 202 (which are the preliminary, additional and "third" set of facets). As the light propagates in this section 200, its lateral aperture dimension ("width") in the plane of the LOE expands as it is partially redirected by reflections from successive facets 202 towards section 207 that includes facets 204 (referred to above as the "first" set of facets). The light reflected from facets 204 is redirected towards section 209 that includes facets 206 (referred to above as the "second" set of facets), to be coupled out towards the viewer.

FIG. 4B shows isometric view of FIG. 4A. Here it can be seen that the section 200 has same width (waveguide thickness) as 207 and 209, so that sections 200, 207 and 209 are integrated within a contiguous LOE, sandwiched between mutually-parallel external surfaces. The guidance throughout these sections is by total internal reflection (TIR) from these external surfaces. The transmission of light between the sections is preferably without disturbance or discontinuity, and the separating lines shown between the sections in various views (e.g., the front views of FIGS. 4A, 5A, 7A, 7B and 9) is for ease of understanding.

Facets 206 are designed to transmit scenery light, allowing the viewer a direct view of an external scene beyond the LOE, and therefore have relatively low reflectivity, typically below 50%. In some configurations facets 204 are also designed to transmit scenery light, and therefore also have relatively low reflectivity, typically below 50%. In other configurations where facets 204 are not part of the "viewing area" of the LOE, higher reflectivities may be used. Facets 202 preferably are outside the viewing area of the LOE and therefore do not need to transmit scenery. High reflectivity is therefore preferably used in order to obtain high efficiency of light transmission. Preferably, the last facet 211 in region 200 has a high reflectivity of at least 90%, and preferably 100% reflectivity. Since section 200 is not designed to transmit scenery light, it is preferably covered (not shown) so no external light passes through it. Alternatively, this section 200 of the waveguide is coated with reflective coating such as silver.

In order to provide relatively uniform image illumination intensity across the optical aperture, one or more of the sets of partially-reflecting surfaces, and preferably each set, most preferably has a sequence of successively-increasing reflectivities in an order in which the image illumination reaches them. By way of example, for waveguide region 200, a sequence of 3 facets having 33%, 50% and 100% reflectivity are effective to reflect roughly a third of the incident illumination from each successive surface. Similar for a sequence of 4 facets, 25%, 33%, 50% and 100% values are effective to reflect roughly a quarter of the incident illumination from each surface. For facets which are within a viewing area through which the viewer observes an external scene, the reflectivity values are lower, and the proportional increase between facets is smaller, but the underlying concept of the increasing sequence to compensate for a lower proportion of illumination intensity remaining within the propagating image illumination remains the same. (Where the ideal reflectivity values for successive facets are relatively close, two or more successive facets in a region of the LOE may be implemented with the same reflectivity value as a manufacturing simplification, but the sequence is still referred to as "successively increasing" since it is monotonically increasing, to provide the above effect of enhanced uniformity.) Thus, for example, facets 204 have a second sequence of successively-increasing reflectivities in an order in which the image illumination reaches them, where the second sequence starts at a reflectivity smaller than a last reflectivity of the first sequence (of facets 204).

In the configuration of FIG. 4A, a majority of the image illumination directed towards facets 204 undergoes exactly one reflection from facets 202. The spacing of the facets 202 is close, ensuring continuity of the image illumination redirected towards facets 204 across an expanded effective aperture, as illustrated by the bounding arrows shown in LOE section 207. This allows the use of a larger spacing for facets 204, thereby reducing production complexity and costs for the larger portion of the waveguide. For, example if the facets 202 expand the aperture by a factor of 3 (using 3 facets with progressive increasing reflectivity) then facets 204 can have roughly three times the spacing compared without section 200. In more general terms, the spacing of facets 204 is typically larger than the spacing of facets 202. Additionally, the surface area of facets 202 is typically smaller than that of facets 204. As a result, only a relatively small volume of closely-spaced facets needs to be produced, while complexity and production costs for the majority of the LOE structure are reduced.

FIG. 4B shows facets in sections 200 and 207 to be perpendicular to the major external surfaces of the waveguide. FIG. 4C shows an alternative implementation according to which the facets of both sections 200 and 207 of the waveguide are at an oblique angle to the major surfaces of the LOE, referred to here as "twisted facets".

Figures 5A, 5B:
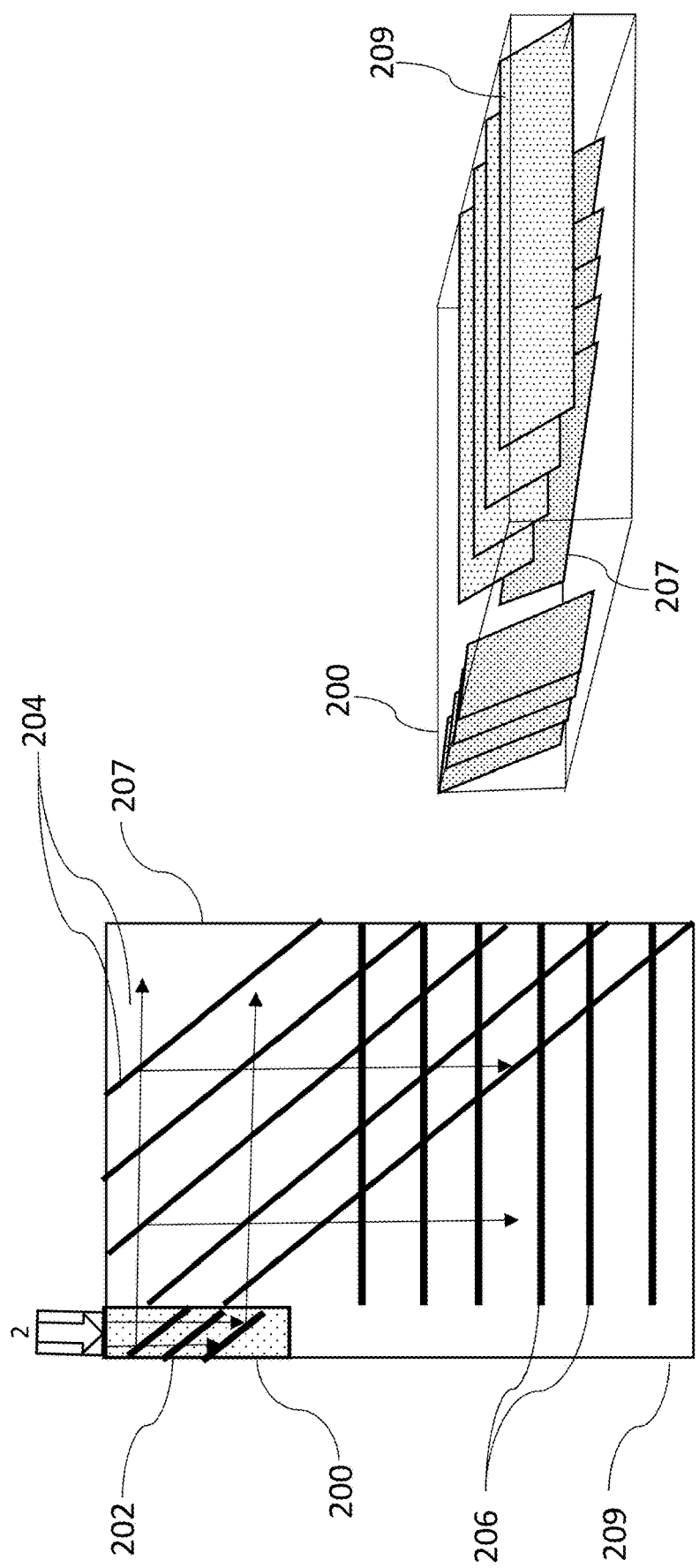
FIGS. 5A and 5B are schematic front and isometric views, respectively, of a variant implementation of the LOE of FIG. 4A in which partially-reflecting internal surfaces for performing two stages of optical aperture expansion are deployed in regions which are at least partially overlapping.

FIGS. 5A and 5B are analogous to FIGS. 4A and 4C, but illustrate that facets 204 and 206 may optionally be implemented in at least partially overlapping regions of the waveguide, in a manner analogous to the corresponding options taught in WO 2019/142177 A1, referred to above. The input aperture expansion section 200 is preferably implemented so as to span a majority, and preferably the full thickness, of the LOE, as shown in FIG. 5B.

Figure 6:
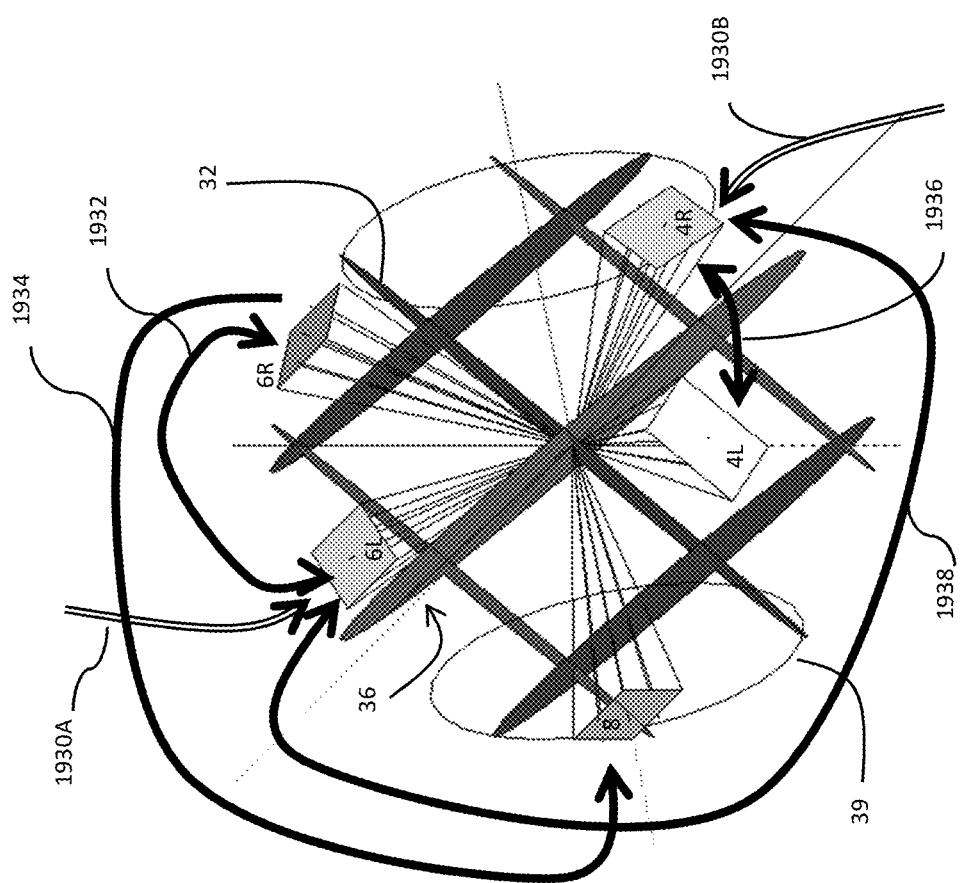
FIG. 6 is a schematic representation in angular space (polar coordinates) of the relative directions of the image illumination through various stages of propagation through the LOE of FIG. 4C.

FIG. 6 illustrates the image reflections for the facets in angular space. This description is for twisted facets as described in FIG. 4C and in FIG. 5. The light is coupled into waveguide 200 as 1930A into one of images 6L or 6R. These two images represent back and forth TIR reflection from the major surfaces of the LOE as the image illumination propagates along aperture expansion section 200. Reflection by facets 202 is represented as 1938 onto 4R and 4L. These are the images propagating by TIR along section 207. In this non-limiting but particularly preferred configuration, facets 202 are parallel to facets 204, so the reflection by facets 204 towards section 209 is also along 1938 from 4R to 6L. Here 6L and 6R also represent images propagating along section 209. In other words, the images propagating in section 200 and 209 are here the same in angular space. The reflection by facets 206 within section 209 coupling out towards the observer is represented as 1934 from guided image 6R to output coupled image 8.

Circles 39 represent the TIR cutoff of the waveguide and are parallel to the plane of the waveguide. It is apparent the images 4L and 4R are diagonal to the plane of the waveguide, i.e., with the sides of the rectangular image in angular space parallel and perpendicular to the major surfaces of the substrate, while images 6L and 6R are aligned parallel to the surfaces of the waveguide. Practically it is typically more convenient to construct a projector 2 for parallel coupling in than for diagonal. As a result, coupling in through waveguide section 200 contributes to simplicity of the projector implementation, and can therefore be of advantage even via a small number of high-reflectivity facets that do not necessarily significantly expand the effective optical aperture of the projector.

Figure 7B:
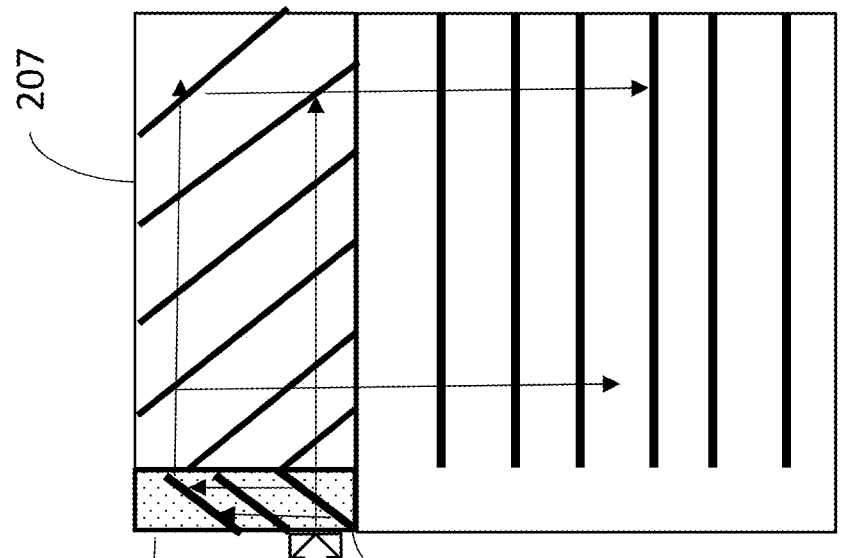
FIGS. 7A and 7B are schematic front views of two further variant implementations of the LOE of FIG. 4A illustrating options for lateral injection of image illumination.
Figure 7A:
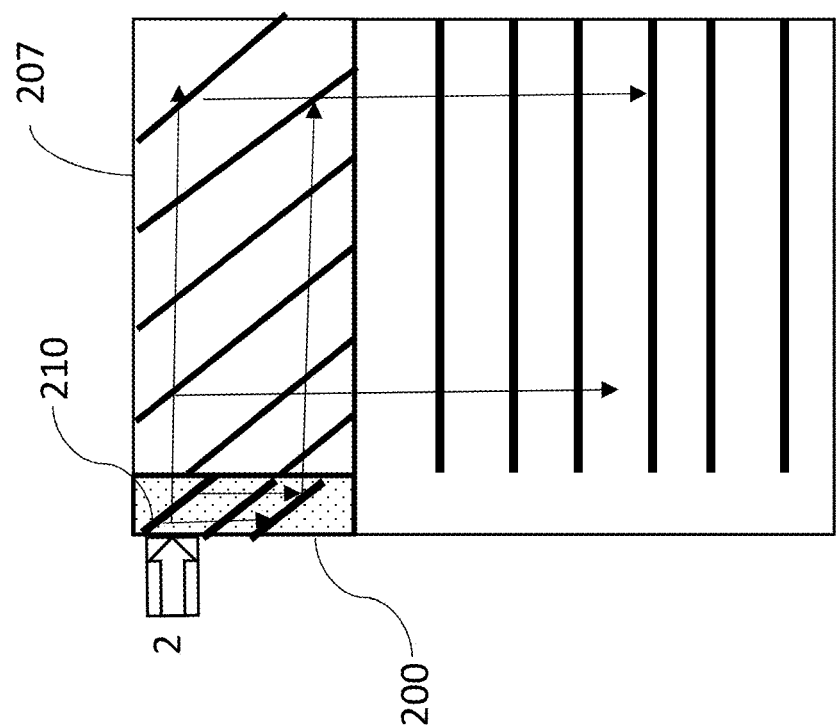

Ergonomic consideration could dictate injection the image from the side of the waveguide, as shown in FIGS. 7A and 7B. In this case, a first facet 210 is advantageously implemented with a high reflectivity in order to achieve approximate uniformity between the image illumination transmitted by the first facet and that reflected by the subsequent facets. For example, if only two facets exist in section 200, the first facet will have 50% reflectivity and the second 100%. However, if there are four facets then the first will have 75% reflectivity (25% transmittance), the second 33%, the third 50% and the last (210) 100%. Alternatively, facet 210 may be implemented with 100% so that all transmission into section 207 is from the subsequent facets.

The configuration presented in FIG. 7A is based on coupling in from 1930B (referring to the angular space illustration of FIG. 6) onto facet 210 that reflects 1938 to 6L. Further propagation is as described before.

FIG. 7B shows an equivalent configuration where the facets in section 200 are at an opposite orientation to enable different position of the projector 2.

In the side-injection cases, the first facet 210 functions primarily as a coupling-in facet, and is an exception to the successively-increasing reflectivities of facets along the sequence of facets, with the "sequence" beginning from the second facet. In these cases, a majority of the image illumination directed towards facets 204 undergoes two reflections from facets 202.

Figure 8A:
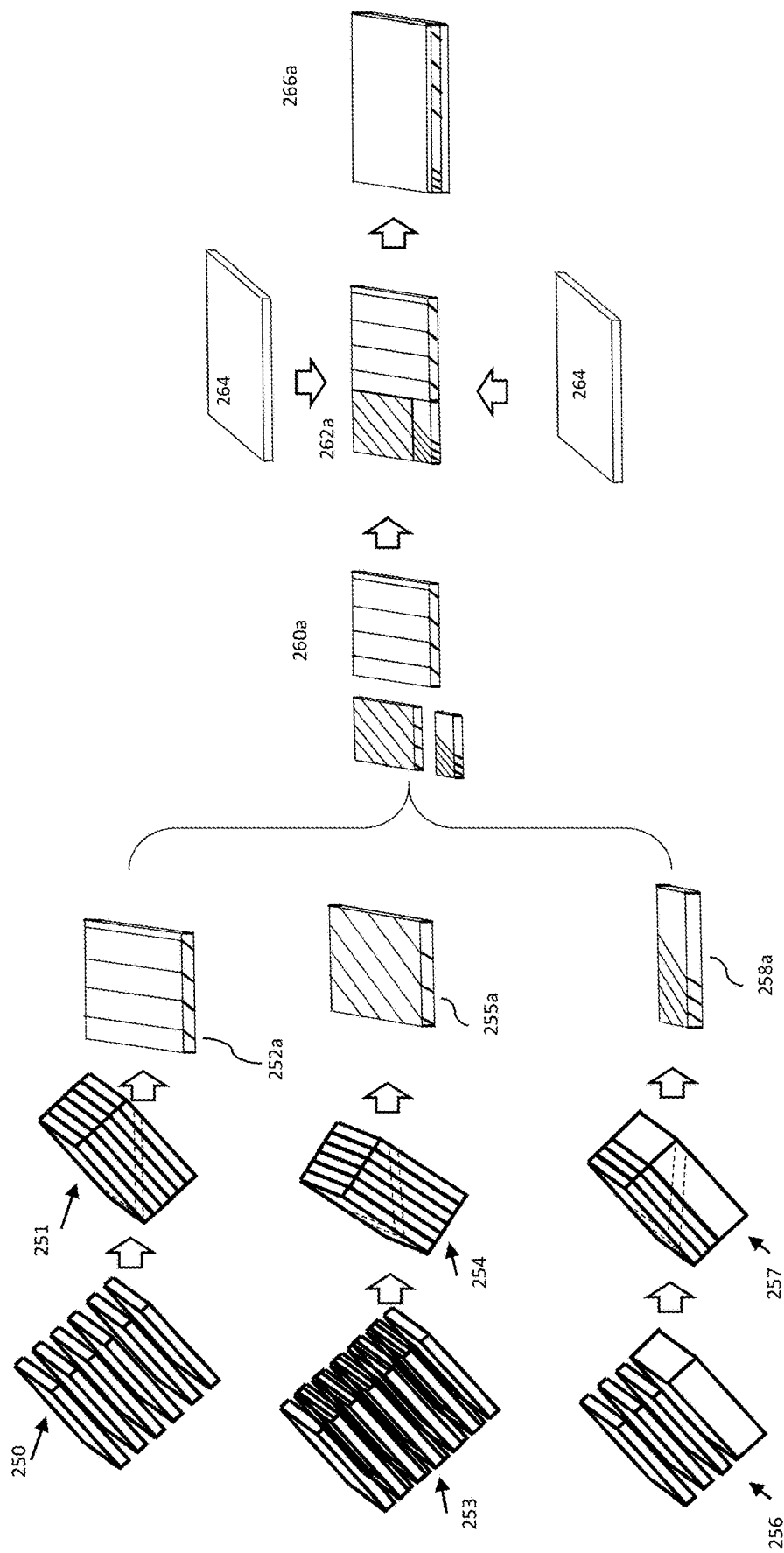
FIG. 8A is a schematic representation of a production sequence for the LOE of FIG. 4A.

FIG. 8A illustrates schematically a method for integrating a waveguide with sections as described in FIGS. 4A-4C. A set of coated plates 253 is glued together to form a stack 254 and sliced 255a to generate the facet section required for section 207. A set of coated plates 250 is glued together to form a stack 251 and sliced diagonally to generate the facet section required for section 209, shown as 252a, and a third set of coated plates 256 is glued together to form a stack 257 which is sliced to generate section 258a (the facets required for section 200). The three sections are combined 260a and glued 262a. The glue is index matched to the waveguide so minimal perturbation introduced to the light as it passes between the sections. A thin cover glass 264 is preferably glued on both sides of the waveguide, and optionally further polished, to generate waveguide 266a having smooth parallel TIR surfaces.

Figure 8B:
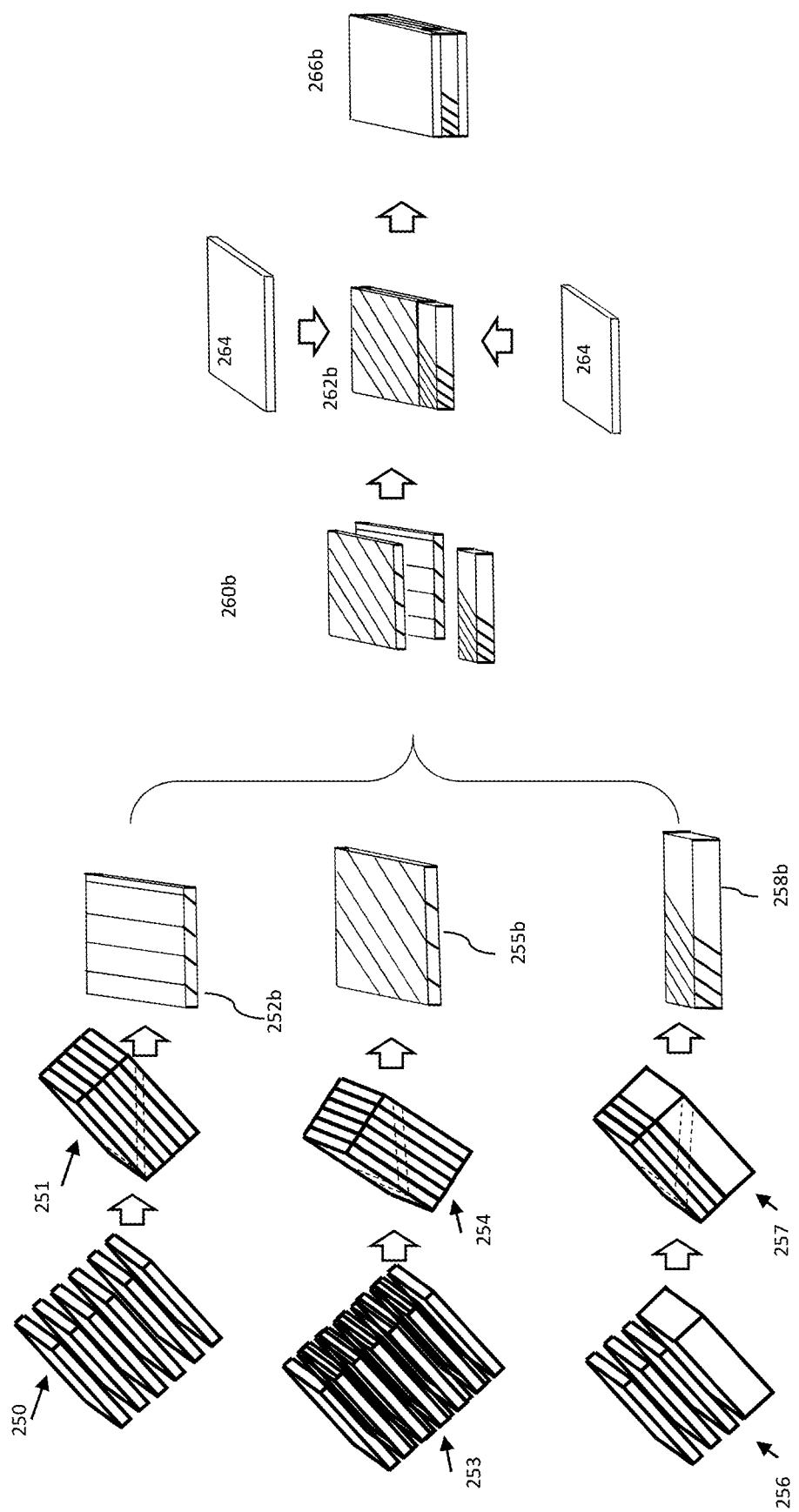
FIG. 8B is a schematic representation of a production sequence for the LOE of FIG. 5A.

FIG. 8B shows a similar manufacturing process suitable for the architecture described in FIGS. 5A and 5B. Sections 252b, 255b and 258b are produced in the same manner as shown in FIG. 8A, but where 258b is twice the thickness as the others. 252b and 255b are stacked while 258B is placed from the side as shown in 260b. The sections are glued together 262b and transparent cover glasses 264 are glued as covers, optionally with further polishing, to generate a single waveguide 266b.

If it is desired to incorporate two overlapping sets of facets within a single layer, this may be done according to the technique explained in the above-referenced WO 2019/142177 A1 with reference to FIG. 11, where the resulting waveguide section containing two sets of facets is combined with the section 258b (corresponding to the facets of section 200) attached to the side prior to addition of the cover sheets.

Figure 9:
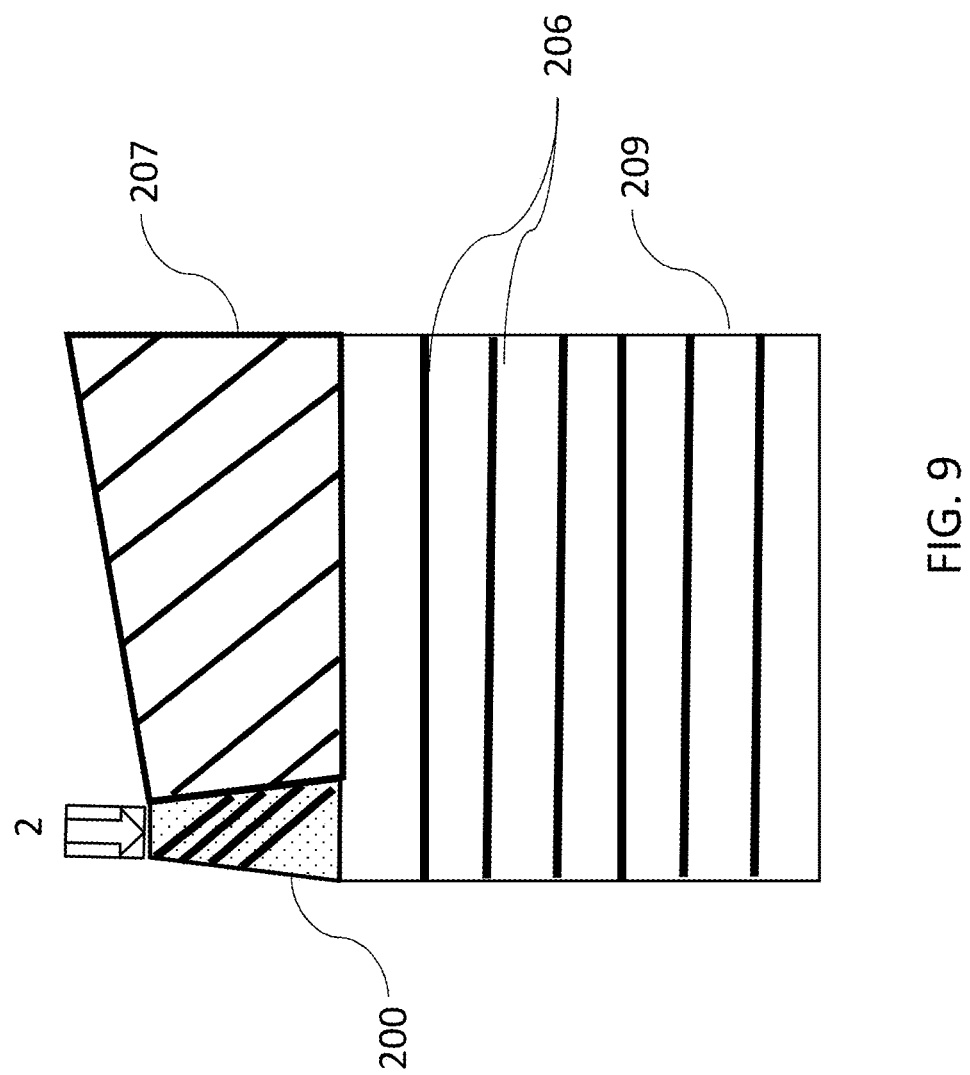
FIG. 9 is a schematic front view of a further variant implementation of the LOE of FIG. 4A in which the geometrical form of the LOE regions is modified.

Although shown thus far as rectangular waveguide sections, it should be noted that the shape of the sections can change according to the propagation of the guided light. By way of one non-limiting example, depending on the geometry of the image propagation, expanding of the image illumination within the waveguide may in some cases require broadening of sections 200 and 207 along the propagation path, resulting in a waveguide form as illustrated in FIG. 9.

Although illustrated thus far as an integrated part of an LOE guided in one dimension, the preliminary stage of aperture expansion may optionally be implemented in various additional configurations which are unguided, guided on different axes, or guided in two dimensions, as will now be exemplified by the non-limiting examples of FIGS. 10A-12B.

In the non-limiting example of FIGS. 10A and 10B, section 200 is implemented as a rectangular waveguide section 270 which guides the image illumination in two dimensions during the preliminary aperture expansion, prior to injection of the expanded aperture image illumination into waveguide section 107. An air gap 295 or some optical layer emulating an air gap is preferably provided to maintain internal reflection within waveguide section 270 except where coupled out. Examples of such 2D waveguide structures may be found in U.S. Pat. No. 10,133,070 and will not be described here in detail.

Figures 11A, 11B:
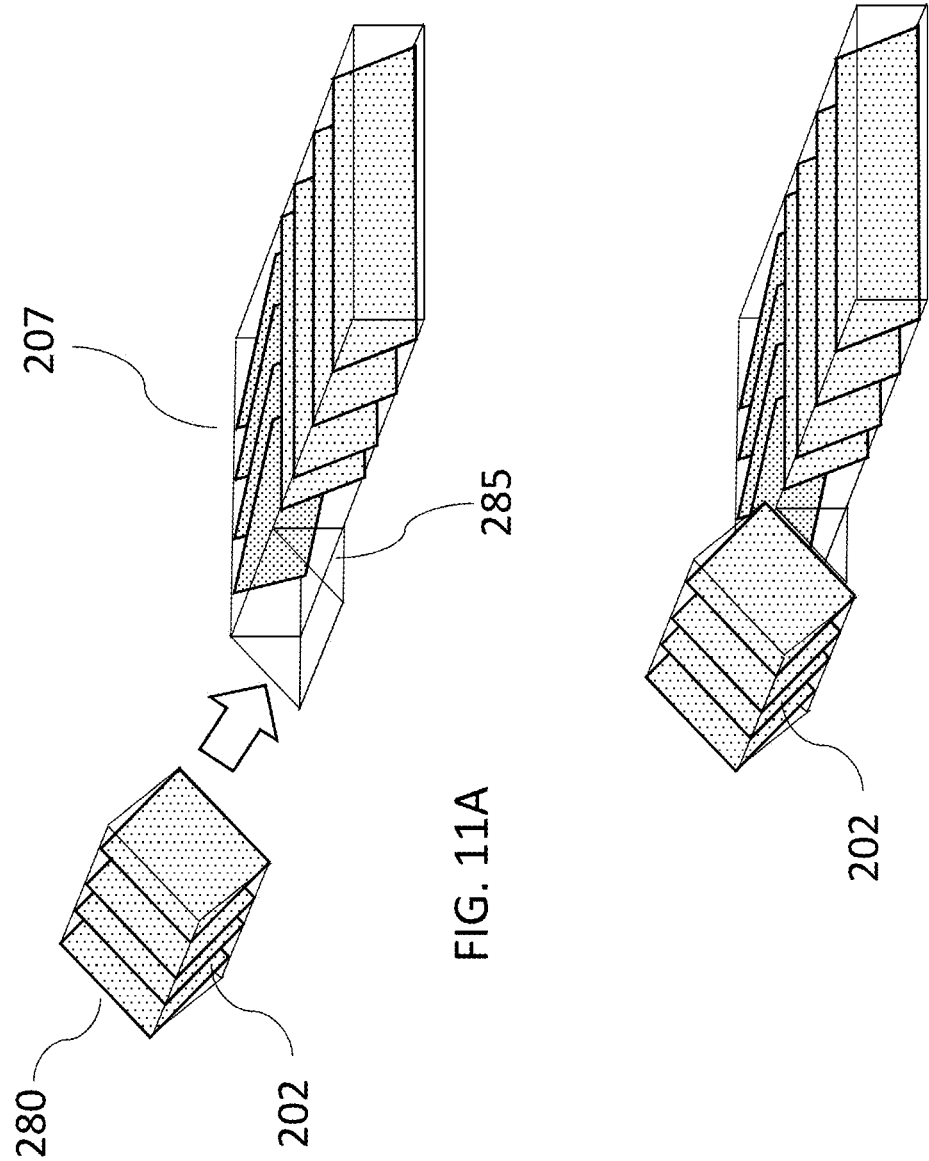
FIGS. 11A and 11B are schematic isometric views before and after assembly, respectively, of a further variant implementation of the LOE of FIG. 4A employing a slab with internal at least partially-reflecting facets for a preliminary stage of optical aperture expansion without light guiding by TIR.

FIGS. 11A and 11B illustrate a further option according to which the coupling-in aperture expansion facets are provided without guiding of the image illumination by TIR. In this case, facets 202 are provided in a first section 280 which is wider than the rest of the waveguide 207. In this configuration, the light in 280 is unguided and propagates through 280 while expanding in both dimensions. In this configuration the coupling into waveguide 207 is preferably achieved via a coupling prism 285. FIG. 11A shows 280 separated from 285 for clarity. The angled orientation of 280 and coupling prism 285 facilitate uniform illumination along the thickness (vertical as shown) dimension of 207. FIG. 11B shows 280 after attachment to coupling-in prism 285.

FIG. 12A shows a further variant implementation according to which the first stage of aperture expansion via facets 202 is provided in a first section 290 that is guided in one dimension that is not parallel to waveguide 207. FIG. 12B shows placement of section 290 on top of a coupling prism 285 where an air-gap 295 is provided in order to preserve TIR guidance within section 290.

In all respects other than those explicitly described here, the arrangement of first set of partially-reflecting internal surfaces 204 and the second set of partially-reflecting internal surfaces 206 within a common waveguide may be implemented according to the range of options described in parallel PCT patent application no. PCT/M2019/157572, which is unpublished as of the filing date of this application and does not constitute prior art.

In all of the front views illustrated herein, the aperture expansion of the present invention is represented schematically by parallel arrows indicating the span of the optical aperture for a given ray direction corresponding to a central pixel on the optical axis of a collimated image. The optical axis is not actually within the X-Y plane, but rather has a Z-component into the page chosen such that the entire range of angles in the depth dimension of the field of view (FOV) undergo total internal reflection at the major substrate surfaces. For simplicity of presentation, the graphic representations herein, and the description thereof, relate only to the in-plane (X-Y) component of the light ray propagation directions, referred to herein as the "in-plane component" or the "component parallel to the major external surfaces of the LOE."

As mentioned above in the context of FIG. 3B, all of the above principles can also be applied to "sideway" configurations, where an image is injected from a POD located laterally outside the viewing area and is spread by a first set of facets vertically and then by a second set of facets horizontally for coupling into the eye of the user. All of the above-described configurations and variants should be understood to be applicable also in a side-injection configuration.

Throughout the above description, reference has been made to the X axis and the Y axis as shown, where the X axis is either horizontal or vertical, and corresponds to the first dimension of the optical aperture expansion, and the Y axis is the other major axis corresponding to the second dimension of expansion. In this context, X and Y can be defined relative to the orientation of the device when mounted on the head of a user, in an orientation which is typically defined by a support arrangement, such as the aforementioned glasses frame of FIGS. 3A and 3B.

Although the invention has been illustrated thus far in the context of a preferred but non-limiting example of a near-eye display, it should be noted that embodiments of various aspects of the invention may be used to advantage in other application including, but not limited to, head-up displays (HUDs). One subset of HUDs of particular interest are HUDs for vehicles.

It will be appreciated that the above descriptions are intended only to serve as examples, and that many other embodiments are possible within the scope of the present invention as defined in the appended claims.

What is claimed is:

1. An optical system for directing image illumination from an image projector towards a user for viewing, the optical system comprising:
   (a) an image projector for projecting a collimated image having an angular field of view about an optical axis, said collimated image having a projector optical aperture;
   (b) a light-guide optical element (LOE) formed from transparent material, said LOE comprising:
      (i) a first region containing a first set of planar, mutually-parallel, partially-reflecting surfaces having a first orientation;
      (ii) a second region containing a second set of planar, mutually-parallel, partially-reflecting surfaces having a second orientation non-parallel to said first orientation;
      (iii) a set of mutually-parallel major external surfaces, said major external surfaces extending across said first and second regions such that both said first set of partially-reflecting surfaces and said second set of partially-reflecting surfaces are located between said major external surfaces; and
      (iv) a coupling-in surface having a coupling-in optical aperture, said coupling-in surface being positioned such that a collimated image introduced via said coupling-in surface propagates within said LOE by internal reflection at said major external surfaces, is partially reflected by said first set of partially-reflecting surfaces to generate a deflected propagating image propagating within said LOE by internal reflection at said major external surfaces, and is partially reflected by said second set of partially-reflecting surfaces to generate a coupled-out image directed outwards from one of said major external surfaces towards the user,
wherein said coupling-in optical aperture has at least one dimension larger than a corresponding dimension of said projector optical aperture, and wherein said image projector is associated with said coupling-in surface via an aperture expanding arrangement comprising a third set of planar, mutually-parallel, at least partially-reflecting surfaces deployed between said image projector and said coupling-in surface, said aperture expanding arrangement expanding an effective optical aperture of said image projector by specular reflection at successive surfaces of said third set of partially-reflecting surfaces to fill said coupling-in optical aperture.

2. The optical system of claim 1, wherein said coupling-in surface is obliquely angled relative to said major external surfaces.

3. The optical system of claim 2, wherein said aperture expanding arrangement further comprises a pair of mutually-parallel external faces, said third set of partially-reflecting surface being located between said external faces, one of said external faces being deployed in facing relation to said coupling-in surface, with an air gap between said external face and said coupling-in surface.

4. The optical system of claim 1, wherein said third set of at least partially-reflecting surfaces has a first sequence of successively-increasing reflectivities in an order in which the image illumination reaches them, and wherein said first set of partially-reflecting surfaces has a second sequence of successively-increasing reflectivities in an order in which the image illumination reaches them, said second sequence starting at a reflectivity smaller than a last reflectivity of said first sequence.

5. The optical system of claim 4, wherein a last reflectivity of said first sequence of successively-increasing reflectivities is greater than 90%.

6. The optical system of claim 1, wherein a majority of the image illumination arriving at said first set of partially-reflecting surfaces has undergone exactly one reflection from said third set of at least partially-reflecting surfaces.

7. The optical system of claim 1, wherein a majority of the image illumination arriving at said first set of partially-reflecting surfaces has undergone two reflections from said third set of at least partially-reflecting surfaces.

8. The optical system of claim 1, wherein said first region and said second region are non-overlapping.

* * * * *